(12) United States Patent
Sekiguchi

(10) Patent No.: US 10,753,404 B2
(45) Date of Patent: Aug. 25, 2020

(54) STEERING DEVICE

(71) Applicant: YAMADA MANUFACTURING CO., LTD., Kiryu-shi, Gunma (JP)

(72) Inventor: Toru Sekiguchi, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 92 days.

(21) Appl. No.: 16/170,092

(22) Filed: Oct. 25, 2018

(65) Prior Publication Data

US 2019/0162241 A1 May 30, 2019

(30) Foreign Application Priority Data

Nov. 30, 2017 (JP) ................................. 2017-229951

(51) Int. Cl.
  *F16D 3/06* (2006.01)
  *F16C 3/03* (2006.01)
  *F16D 3/12* (2006.01)

(52) U.S. Cl.
  CPC .................. *F16D 3/06* (2013.01); *F16C 3/03* (2013.01); *F16D 3/12* (2013.01); *F16C 2202/04* (2013.01); *F16C 2208/10* (2013.01); *F16C 2208/20* (2013.01); *F16C 2326/24* (2013.01)

(58) Field of Classification Search
  CPC ..... F16D 3/06; F16D 3/12; F16D 3/40; F16D 3/185; F16D 3/035; F16C 3/03; B62D 1/16; B62D 1/185
  See application file for complete search history.

(56) References Cited

U.S. PATENT DOCUMENTS

| 4,667,530 A | * | 5/1987 | Mettler ................. B62D 1/185 403/225 |
| 4,705,491 A | * | 11/1987 | Andersson ............ F16C 29/123 464/167 |
| 6,948,401 B2 | * | 9/2005 | Zernickel ............... B62D 1/185 384/49 |

(Continued)

FOREIGN PATENT DOCUMENTS

| DE | 102012111258 A1 | 5/2014 |
| JP | 2004-322688 | 11/2004 |
| JP | 2016-060294 A | 4/2016 |

OTHER PUBLICATIONS

German Search Report dated Sep. 16, 2019, 5 pages.
Letter from Kroher/Strobel dated Sep. 25, 2019, commenting on German Search Report dated Sep. 16, 2019, 2 pages.

*Primary Examiner* — Karen Beck
(74) *Attorney, Agent, or Firm* — Rankin, Hill & Clark LLP

(57) ABSTRACT

A steering device includes an inner shaft and an outer shaft. The inner shaft includes an axial member provided on an axial line, a first abutting member provided on an outer circumference of the axial member, and a second abutting member disposed adjacent to the first abutting member, and having a different hardness from that of the first abutting member. An abutting member support of the axial member where the first abutting member and the second abutting member are provided is formed in a shape other than a circular shape. The outer shaft includes a torque transmitting member which abuts only either the first abutting member or the second abutting member and which is capable of transmitting torque only with the abutting member that is abutting the torque transmitting member.

9 Claims, 8 Drawing Sheets

(56) References Cited

U.S. PATENT DOCUMENTS

| | | | | |
|---|---|---|---|---|
| 7,316,418 B2* | 1/2008 | Goto | ................... | F16D 3/76 |
| | | | | 280/779 |
| 7,481,130 B2* | 1/2009 | Yamada | ................ | F16C 3/035 |
| | | | | 74/493 |
| 8,388,455 B2* | 3/2013 | Eltner | ................. | F16D 3/06 |
| | | | | 464/16 |
| 9,592,847 B2* | 3/2017 | Hansen | ................ | B62D 7/224 |
| 2006/0156855 A1* | 7/2006 | Yukawa | ................ | B62D 1/16 |
| | | | | 74/493 |
| 2019/0276068 A1* | 9/2019 | Sekiguchi | ................ | F16F 1/00 |
| 2019/0276069 A1* | 9/2019 | Sekiguchi | ............... | B62D 1/185 |

* cited by examiner

STEERING DEVICE

FIELD OF THE INVENTION

The present disclosure relates to a steering device that transmits a steering wheel torque from a steering wheel to wheels.

BACKGROUND

A driver of a vehicle turns a steering wheel to drive the vehicle. The steering effort to the steering wheel is transmitted to wheels via a steering device. When the wheels are turned to the right or to the left, the running direction of the vehicle is controlled. JP 2004-322688 A discloses a technology relating to such a steering device.

The steering device disclosed in JP 2004-322688 A includes a steering column fastened to a vehicular body, a main shaft which is supported by this steering column and which has an upper end to which a steering wheel is fastened, an intermediate shaft connected to the lower end of this main shaft via a joint, and a gearbox connected to the lower end of this intermediate shaft via a joint.

By turning the steering wheel, tie rods are displaced to the right or to the left via the gearbox, and thus the wheels are turned.

SUMMARY OF THE INVENTION

Meanwhile, as for the feeling to be transmitted to the driver when turning the steering wheel, the preference differs driver by driver. For example, there are some drivers who prefer the further transmission of the feeling on the unevenness, etc., of a road surface, and in contrast, there are also some drivers who prefer suppression of the transmission of the feeling on the unevenness, etc., of the road surface. If the feeling to be transmitted to a driver when the steering wheel is turned is selectable, more drivers can drive comfortably, thus preferable.

An objective of the present disclosure is to provide a steering device enabling selection of a steering feeling.

According to the present disclosure, there is provided a steering device that comprises:

an inner shaft rotatable around an axial line; and an outer shaft partially covering the inner shaft and rotatable together with the inner shaft;

wherein the inner shaft and the outer shaft are provided so as to be relatively movable to each other along the axial line;

wherein the inner shaft comprises:

an axial member provided on the axial line;

a first abutting member provided on an outer circumference of the axial member; and a second abutting member provided on the outer circumference of the axial member adjacent to the first member, and having a different hardness from a hardness of the first abutting member;

wherein an abutting member support of the axial member where the first abutting member and the second abutting member are provided is formed in a shape other than a circular shape with reference to a vertical cross-section to the axial line; and wherein the outer shaft comprises a torque transmitting member which abuts only either the first abutting member or the second abutting member and which is capable of transmitting torque only with the abutting member that is abutting the torque transmitting member.

According to the present disclosure, the torque transmitting member is provided which abut only either the first abutting member or the second abutting member and which is capable of transmitting torque with the abutting member that abuts the torque transmitting member. The outer shaft and the inner shaft are provided so as to be relatively movable to each other. Movement of the outer shaft or the inner shaft causes the torque transmitting member to abut either the first abutting member or the second abutting member. At this time, only the abutting member that abuts the torque transmitting member is capable of transmitting torque therewith. That is, the abutting member that does not abut the torque transmitting member is unable to transmit the torque with the torque transmitting member. Moreover, the first abutting member and the second abutting member have different hardness. A feeling to be transmitted to a driver when turning a steering wheel differs when the torque is transmitted via the first abutting member and when the torque is transmitted via the second abutting member. Selection of such a feeling can be made by relatively moving the outer shaft and the inner shaft to each other. Therefore, a steering device that enables selection of a steering feeling is provided.

In particular, selection of the steering feeling is enabled by a simple mechanical structure. Although the steering device is hence inexpensive, the steering feeling can be selected as appropriate, thus suitable.

BRIEF DESCRIPTION OF THE DRAWINGS

Several preferable embodiments of the present disclosure will be described in detail below with reference to the accompanying drawings in which.

DETAILED DESCRIPTION OF THE EMBODIMENTS

An embodiment of the present disclosure will be described below with reference to the accompanying drawings.

Embodiment

Figure 1:
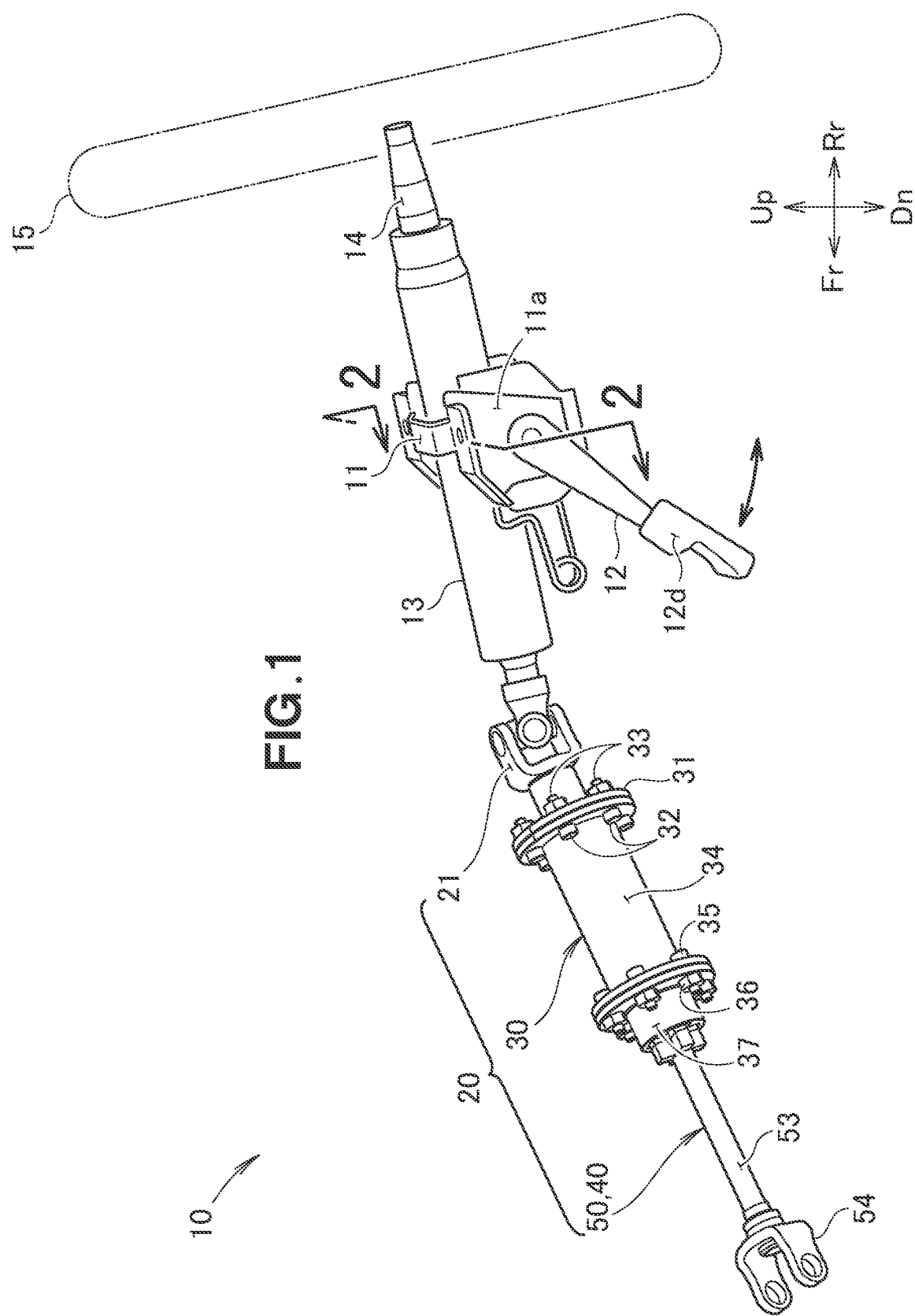
FIG. 1 is a perspective view of a steering device according to an embodiment of the present disclosure.

With reference to FIG. 1, a steering device 10 is installed on the front part of a vehicle. The steering device 10 includes a support member 11 fastened to a vehicle body, a lock mechanism 12 supported by the support member 11, a steering column 13 supported by the lock mechanism 12, an upper shaft 14 rotatably supported by the steering column 13, a steering wheel 15 fastened to the rear end of the upper shaft 14 and the upper end thereof, and an intermediate shaft 20 coupled to the steering column 13.

In the following description, the term back and forth means from the front to the rear with reference to the running direction of the vehicle, and the term right and left means the right side and the left side with reference to a person in the vehicle. In the figure, the terms Fr, Rr, Up, Dn, Le, and Ri indicate front, rear, up, down, left and right, respectively, as viewed from the person in the vehicle.

The lock mechanism 12 restricts the movement of the steering column 13 in the axial direction (the back-and-forth direction) in a locked condition, and allows the movement of the steering column 13 in the axial direction in an unlocked condition.

The lock mechanism 12 may be a conventionally known telescopic mechanism capable of adjusting the back-and-forth position of the steering wheel 15.

Figure 2:
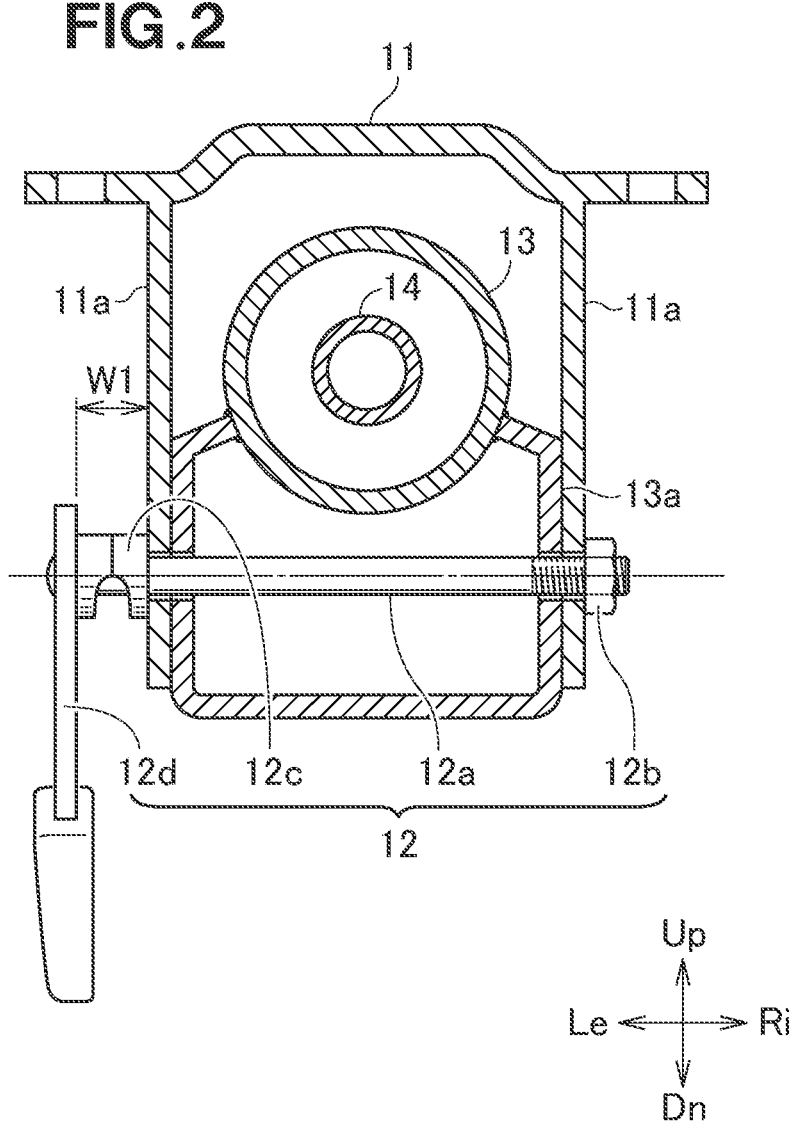
FIG. 2 is a cross-sectional view taken along a line 2-2 in FIG. 1.

With reference to FIG. 2, the support member 11 has right and left side walls 11a and 11a that extend downwardly along the side surface of the steering column 13.

The lock mechanism 12 in FIG. 2 is in a locked condition. The lock mechanism 12 includes a fastening bolt 12a which passes through the right and left side walls 11a and 11a and which is capable of fastening the right and left side walls 11a and 11b, a nut 12b which fastens one end of the fastening bolt 12a and which is fastened to the right side wall 11a, a cam member 12c provided at the other end of the fastening bolt 12a, and an operation lever 12d which is fastened to the cam member 12c and which can be operated by a person in the vehicle.

The steering column 13 includes a movable bracket 13a which is held between the right and left side walls 11a and 11a and which is movable in the back-and-forth direction when the lock mechanism 12 is unlocked.

The movable bracket 13a is provided with telescopic adjustment holes 13b and 13b through which the fastening bolt 12a passes through and which are in an elongated circular shape in the back-and-forth direction.

With reference to FIG. 1, the steering wheel 15 is turned when operated by a driver. The torque when the steering wheel 15 is turned is transmitted to the wheels via the steering column 13 and the intermediate shaft 20. That is, the steering wheel 15, the steering column 13, and the intermediate shaft 20 are provided so as to be rotatable around the respective axes.

Figure 3:
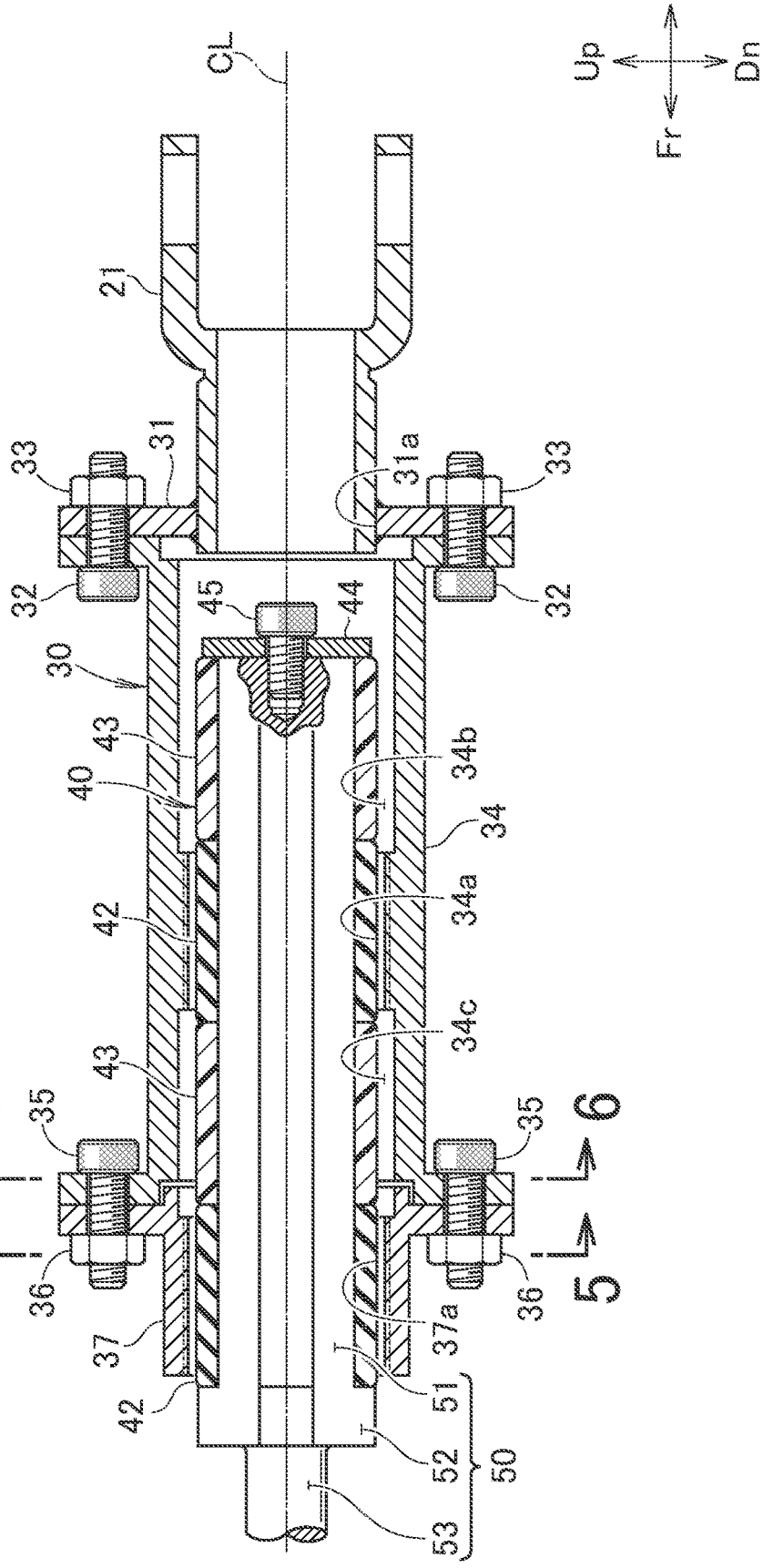
FIG. 3 is a cross-sectional view of the steering device illustrated in FIG. 1.

With reference to FIG. 3, the intermediate shaft 20 includes a joint 21 coupled to the upper shaft 14 (see FIG. 1), an outer shaft 30 which is coupled to the joint 21 and which is rotatable together with the joint 21, and an inner shaft 40 which is provided inside the outer shaft 30 and which is rotatable together with the outer shaft 30.

The outer shaft 30 includes the fastening plate 31 with a fitting hole 31a in which the joint 21 is fitted, a first cylindrical member 34 fastened to the fastening plate 31 via bolts 32 and respective nuts 33, and a second cylindrical member 37 fastened to the first cylindrical member 34 via bolts 35 and respective nuts 36.

The first cylindrical member 34 is a cylindrical member having respective flanges formed at both ends. A torque transmitting member 34a that protrudes toward the inner shaft 40 is formed at the substantial center of the first cylindrical member 34.

Portions 34b and 34c adjacent to a portion where the torque transmitting member 34a is formed are formed in a circular shape with reference to a vertical cross-section to an axial line CL. The portions 34b and 34c adjacent to the torque transmitting member 34a are formed at two locations in such a way that the torque transmitting member 34a is held therebetween.

The second cylindrical member 37 includes a torque transmitting member 37a which is formed across the substantially entire inner circumference and which protrudes toward the inner shaft 40.

As is clear from the above description, the two torque transmitting members 34a and 37a and the circular portions 34b and 34c at the two locations are arranged alternately on the inner surface of the outer shaft 30. In other words, the portion capable of transmitting the torque and the portion that does not transmit the torque are arranged alternately.

Figure 4:
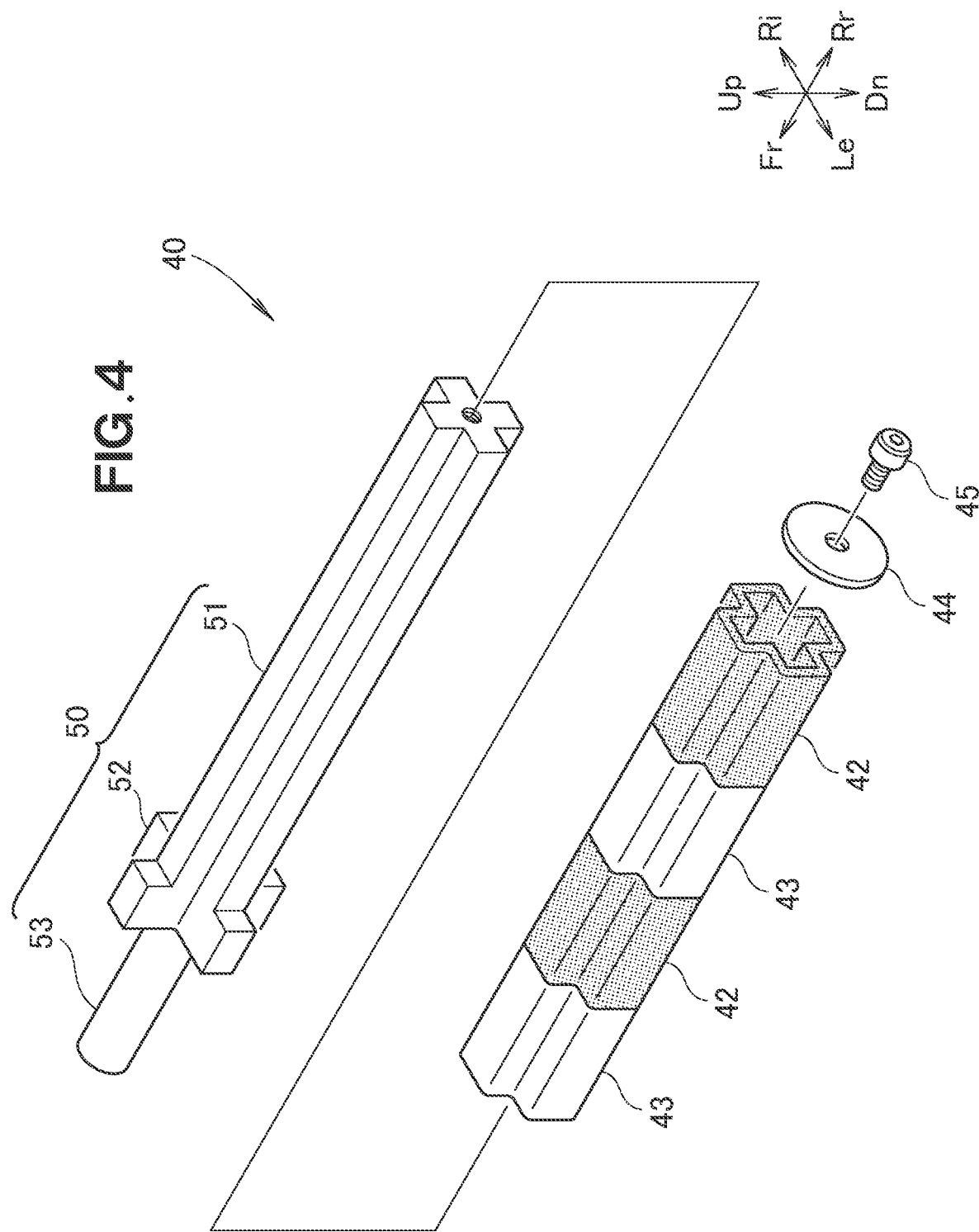
FIG. 4 is an exploded perspective view of the steering device illustrated in FIG. 1.

With reference to FIG. 4, the inner shaft 40 includes an axial member 50 provided on the axial line CL, two first abutting members 42 provided on the outer circumference of the axial member 50, two second abutting members 43 which are arranged side by side with the first abutting members 42 on the outer circumference of the axial member 50 and which have a different hardness from that of the first abutting member 42, a circular washer 44 which contacts the end of the second abutting member 43 and which prevents the second abutting member 43 from being detached from the axial member 50, and a screw 45 that fastens the washer 44 to the axial member 50.

The axial member 50 includes a support 51 which is formed in a substantially X-shape with reference to a vertical cross section to the axial line CL and which has the first abutting members 42 and the second abutting members 43 attached to the outer circumference, an abutting member stopper 52 which is formed integrally at the end of the abutting member support 51 and which spreads in the radial direction, an inner shaft connecting member 53 which extends from the abutting member stopper 52 along the axial line CL and which is connected to the component relevant to the wheels, and a joint 54 (see FIG. 1) fastened to the end of the inner shaft connecting member 53.

The abutting member stopper 52 abuts the end of the second abutting member 43, and prevents the second abutting member 43 from being detached from the axial member 50. When the abutting member stopper 52 that protrudes in the radial direction is not applied, the washer may be adopted for preventing the detachment.

The first abutting member 42 and the second abutting member 43 are each provided at least one. The first abutting member 42 and the second abutting member 43 are formed in the same shape. As for the first abutting member 42 and the second abutting member 43, the first abutting member 42 may be disposed first, or the second abutting member 43 may be disposed first. That is, the first abutting member 42 and the second abutting member 43 may be disposed in the opposite sequence to the illustrated sequence. In this case, the first abutting member 42 abuts the abutting member stopper 52.

The first abutting member 42 is, for example, a sleeve formed of a Chloroprene Rubber (CR), and is formed in a substantially X-shape along the outer circumference of the abutting member support 51.

The second abutting member 43 is, for example, a sleeve formed of a resin like a polyacetal resin (POM), and is formed in a substantially X-shape along the outer circumference of the abutting member support 51.

Figure 5:
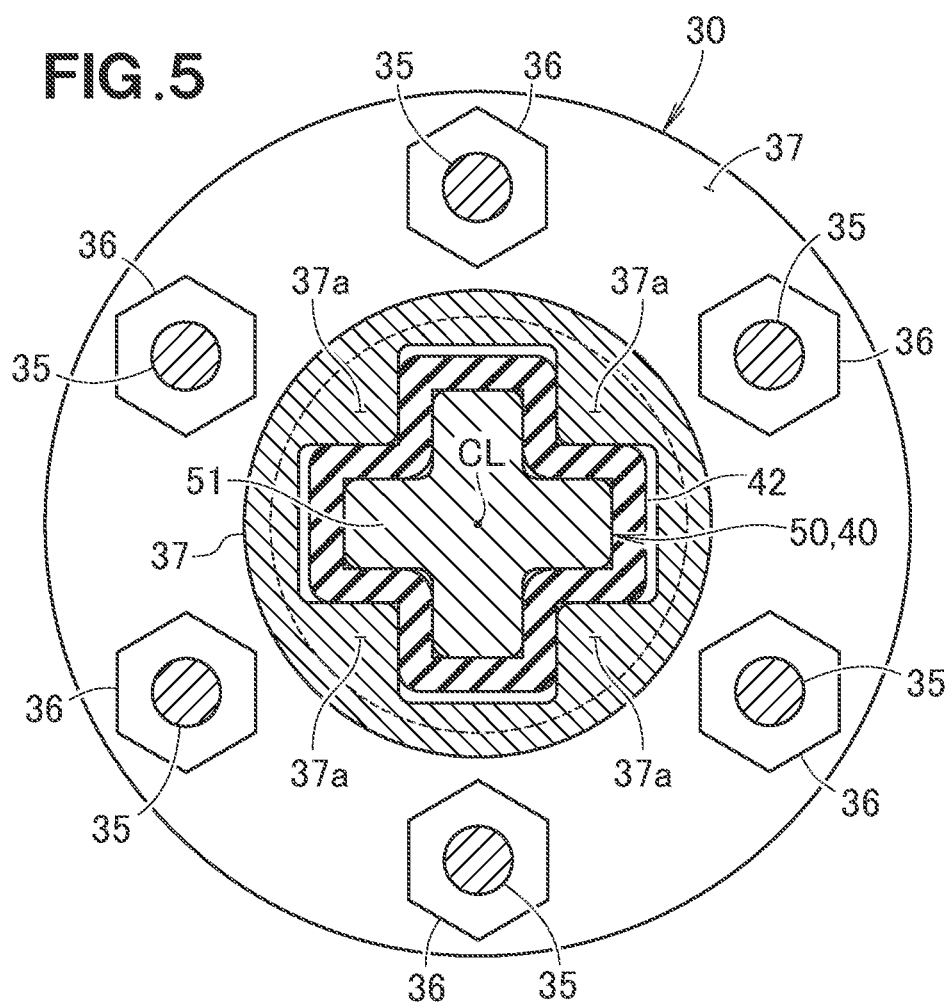
FIG. 5 is a cross-sectional view taken along a line 5-5 in FIG. 3.
Figure 6:
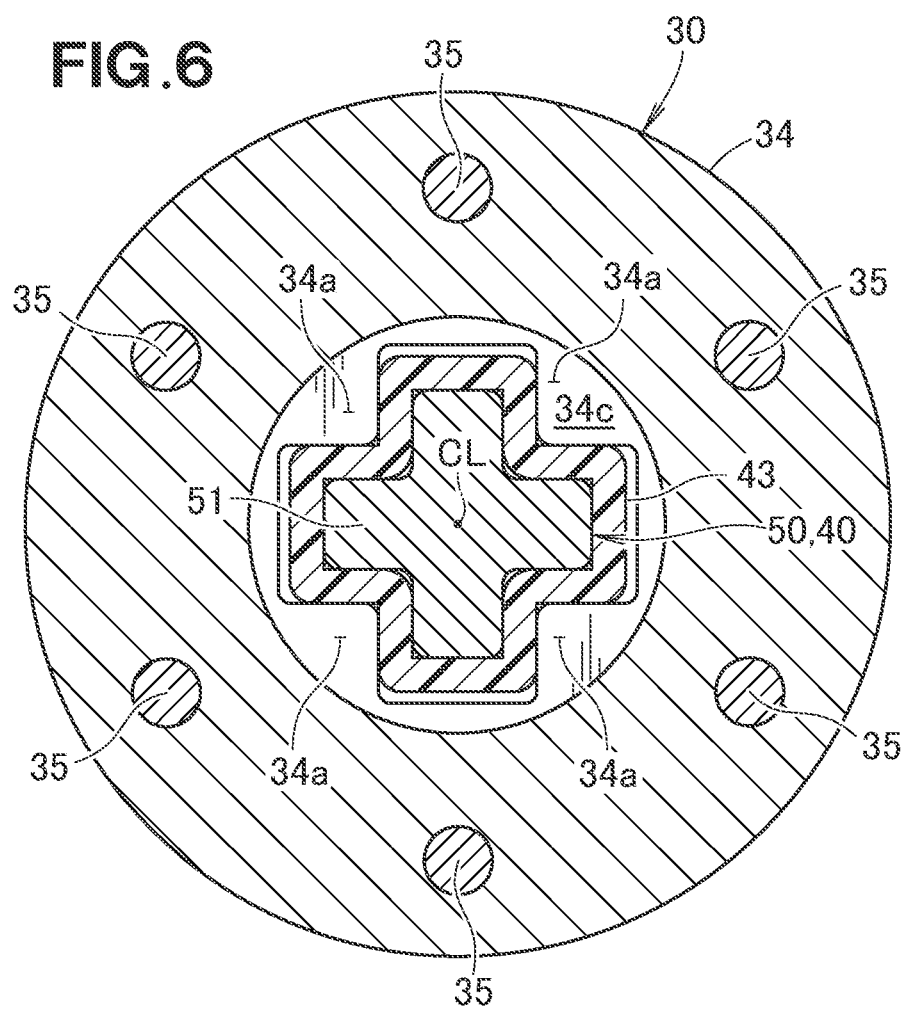
FIG. 6 is a cross-sectional view taken along a line 6-6 in FIG. 3.

With reference to FIGS. 5 and 6, the torque transmitting member 37a is disposed along the outer circumference of the first abutting member 42 and that of the second abutting member 43. That is, in a vertical cross-sectional view to the axial line CL, the torque transmitting member 37a is formed in a substantially X-shape hole with respect to the first abutting member 42 and the second abutting member 43 formed in a substantially X-shape. The same is true of the torque transmitting member 34a formed on the first cylindrical member 34.

The torque transmitting member 37a abuts only the first abutting member 42, and does not abut the second abutting member 43. With reference to FIG. 3, similarly, the torque transmitting member 34a formed on the first cylindrical member 34 abuts only the first abutting member 42, and does not abut the second abutting member 43.

An action of the steering device 10 will be described below.

The torque produced when the steering wheel 15 (see FIG. 1) is turned is transmitted only to the first abutting member 42 from the torque transmitting members 34a and 37a. In contrast, the energy input to the wheels due to, for example, unevenness of a road surface is transmitted to the torque transmitting members 34a and 37a via the first abutting member 42, and is transmitted to the driver who is gripping the steering wheel 15. The steering feeling transmitted via the first abutting member 42 has little vibration, and the driver can feel such that the turning of the steering wheel is not heavy.

According to the present disclosure, the steering feeling to be transmitted to the steering wheel 15 can be changed. With reference to FIGS. 1 and 2, when the steering feeling is changed, the driver turns the operation lever 12d of the lock mechanism 12.

Figure 7:
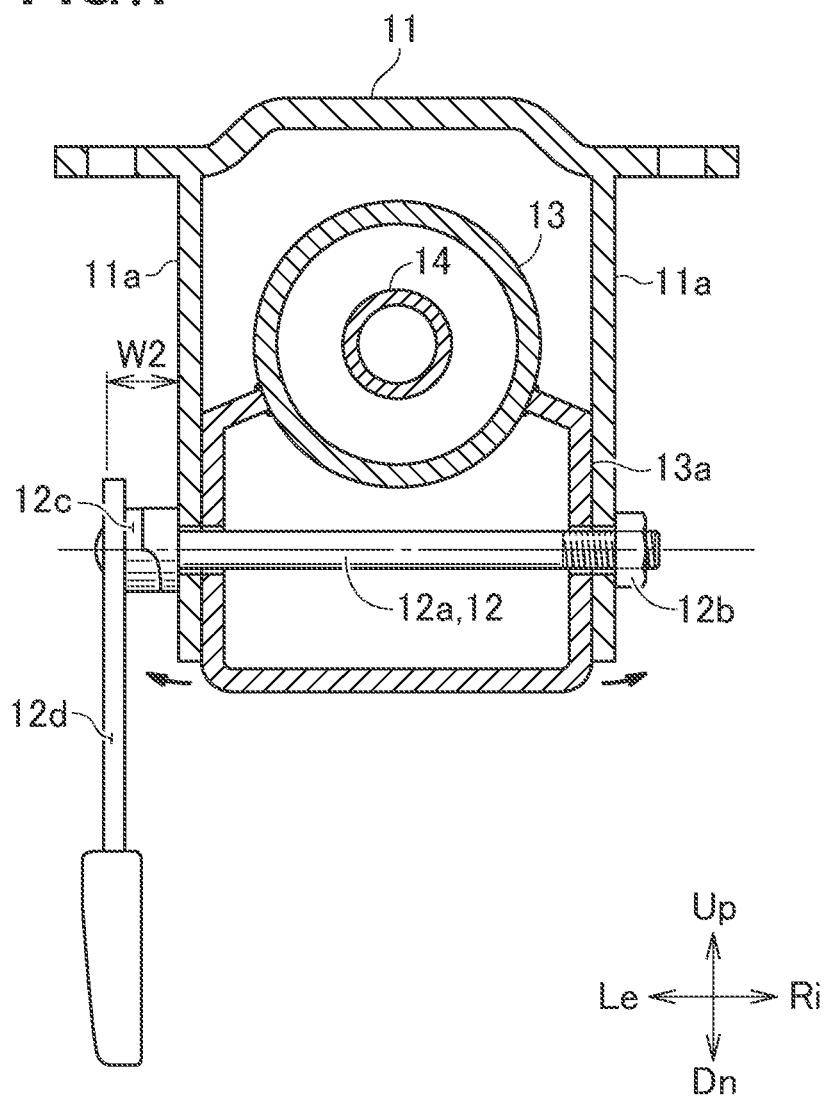
FIG. 7 is an explanatory diagram for an action of a lock mechanism illustrated in FIG. 2.

With reference to FIGS. 2 and 7, by turning the operation lever 12d, the width of the cam member 12c becomes narrow from W1 to W2. The side walls 11a and 11a fastened by the cam member 12c and the nut 12b spreads by what corresponds to the narrowed width of the cam member 12c. The holding force by the side walls 11a and 11a decreases. Since the telescopic adjustment hole 13b is in a circular shape elongated in the back-and-forth direction, the movable bracket 13a can be moved in the back-and-forth direction by what corresponds to the length of the telescopic adjustment hole 13b. That is, by turning the operation lever 12d from the condition illustrated in FIG. 2, the lock mechanism 12 is changed from a locked condition to an unlocked condition.

With reference to FIG. 1, in the unlocked condition, by moving the steering wheel 15 back and forth, the steering column 13 and the outer shaft 30 are displaced in the back-and-forth direction. The inner shaft 40 is not displaced.

From the condition illustrated in the figure, backward displacement of the outer shaft 30 enables the steering feeling to be changed. The displacement amount is by a length of the first abutting member 42 and second abutting member 43 in the axial direction, and is, for example, 0.5 to 3 cm. After the outer shaft 30 is displaced, the operation lever 12d is turned to return the lock mechanism 12 to the locked condition. This disables the displacement of the steering column 13 and that of the outer shaft 30.

Figure 8:
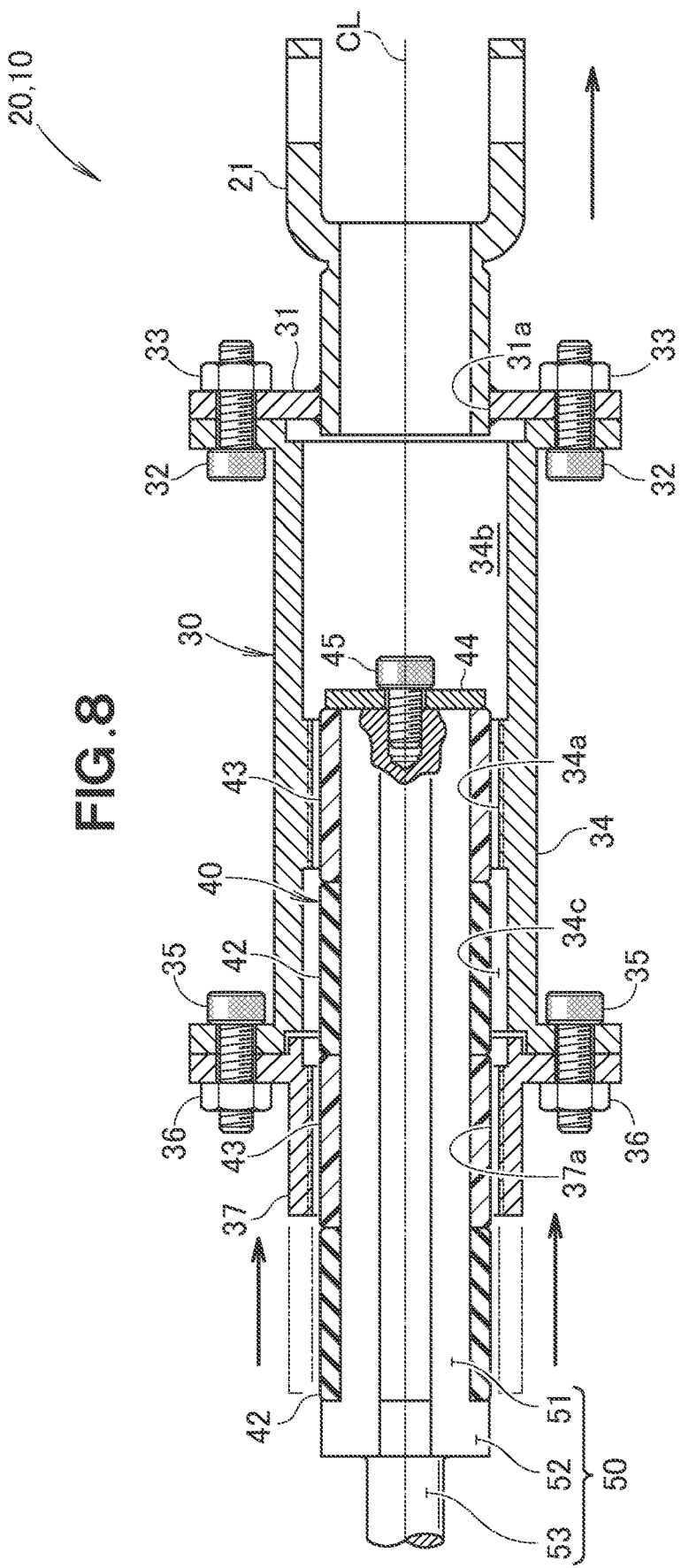
FIG. 8 is an explanatory diagram for an action of the steering device illustrated in FIG. 1.

With reference to FIG. 8, by displacing the outer shaft 30 backwardly, the torque transmitting members 34a and 37a abut the second abutting member 43. In this case, the torque of the outer shaft 30 is transmitted to the second abutting member 43, and is not transmitted to the first abutting member 42. The reaction force against the torque is transmitted to the steering wheel 15 (see FIG. 1) via the outer shaft 30. The steering feeling transmitted via the second abutting member 43 allows the driver to feel road surface vibrations, and the driver can feel such that the response to the turning of the steering wheel is prompt.

Since the first abutting member 42 (e.g., rubber) and the second abutting member 43 (e.g., hard resin) are formed of different materials, the steering feeling changes in accordance with the portion where the torque transmitting members 34a and 37a abut.

The effects of the steering device 10 according to the present disclosure will be described below.

With reference to FIG. 3, the steering device includes the torque transmitting members 34a and 37a which abut only either the first abutting member 42 or the second abutting member 43 and which is capable of transmitting torque only with the abutting member (in the figure, the first abutting member 42). The outer shaft 30 and the inner shaft 40 are provided so as to be movable relative to each other.

Also with reference to FIG. 8, movement of the outer shaft 30 causes the torque transmitting members 34a and 37a to abut either the first abutting member 42 or the second abutting member 43. At this time, only the abutting member (in FIG. 3, the first abutting member 42, and in FIG. 8, the second abutting member 43) is capable of transmitting torque with the torque transmitting members 34a and 37a. That is, the abutting member not abutting (in FIG. 3, the second abutting member 43 and in FIG. 8, the first abutting member 42) is unable to transmit torque with the torque transmitting members 34a and 37a. In addition, the first abutting member 42 and the second abutting member 43 have different hardness. When the torque is transmitted via the first abutting member 42 and when the torque is transmitted via the second abutting member 43, the feeling transmitted to the driver when turning the steering wheel 15 (see FIG. 1) becomes different. Such a selection of the feeling can be made by relatively moving the outer shaft 30 and the inner shaft 40. Hence, the steering device 10 that enables selection of the steering feeling is provided.

In particular, the selection of the steering feeling is enabled by a simple mechanical structure. Although the steering device 10 is hence inexpensive, the steering device enables selection of the steering feeling as appropriate, thus suitable.

With reference to FIGS. 5 and 6, the torque transmitting members 34a and 37a protrude toward the inner shaft 40, and the inner circumference surface of the outer shaft 30 adjacent to the portions 34b and 34c of the torque transmitting member 34a is in a circular shape. The portions 34b and 34c adjacent to the torque transmitting members 34a and 37a that protrude toward the inner shaft 40 are in a circular shape. Such a simple structure can separate the portion that abuts each abutting member 42, 43, and the portion that does not abut each abutting member.

Moreover, the torque transmitting members 34a and 37a are disposed along the outer circumference of the first abutting member 42 and that of the second abutting member 43. This further ensures torque transmission between the torque transmitting members 34a and 37a and the abutting member (the first abutting member 42) that abuts such torque transmitting member.

The first abutting member 42 is formed of a rubber, and the second abutting member 43 is formed of a resin. In particular, this enables changes in the steering feeling.

The abutting member support 51 is formed in a substantially X-shape with reference to the vertical cross-section to the axial line CL, and the first abutting member 42 and the second abutting member 43 have respective shapes along the outer circumference of the abutting member support 51. Hence, the first abutting member 42 and the second abutting member 43 are formed in a substantially X-shape with reference to the vertical cross-section to the axial line CL. This surely transmits the torque while permitting a movement in the axial direction.

With reference to FIG. 3, the first cylindrical member 34 has the portions 34b and 34c of the inner circumference surface in a circular shape so as to hold the torque transmitting member 34a therebetween and formed at two locations, and the second cylindrical member 37 includes the torque transmitting member 37a. By employing the two cylindrical members 34 and 37, the outer shaft 30 which facilitates demolding and which has the plurality of torque transmitting members 34a and 37a can be provided. By providing the plurality of torque transmitting members 34a, 37a, the torque is surely transmitted, and a difference in steering feeling can be further transmitted to the driver.

Although the intermediate shaft has been described as an example, the steering device according to the present disclosure is also applicable to a steering shaft etc., and the application is not limited to any particular type.

Moreover, the position of the inner shaft and that of the outer shaft may be inverted relative to the described positions in the embodiment. That is, the inner shaft may be provided at the steering-wheel side, and the outer shaft may be provided at the wheel side.

Furthermore, depending on the position of the inner shaft and that of the outer shaft, a structure in which the inner shaft is movable in the back-and-forth direction and the outer shaft is not movable, or a structure in which both the inner shaft and the outer shaft are movable may be employed. That is, it is appropriate if the inner shaft and the outer shaft are movable relative to each other along the axial line.

The shape of the first abutting member and that of the second abutting member are not limited to the shape along the axial member. The external shape of the first abutting member and that of the second abutting member may be an X-shape with reference to the vertical cross-section to the axial line relative to the axial member formed in a rectangular shape with reference to the vertical cross-section to the axial line.

In addition, the abutting member support portion can be not only in a substantially X-shape with reference to the vertical cross-section to the axial line, but also in a rectangular or an elliptical shape. That is, it may be a non-circular shape other than a circular shape.

The present disclosure is not limited to the above described embodiment as long as the actions and effects of the present disclosure are achievable.

INDUSTRIAL APPLICABILITY

The steering device according to the present disclosure is suitable for passenger vehicles.

What is claimed is:

1. A steering device comprising:
an inner shaft rotatable around an axial line; and
an outer shaft partially covering the inner shaft and rotatable together with the inner shaft;
wherein the inner shaft and the outer shaft are provided so as to be relatively movable to each other along the axial line;
wherein the inner shaft comprises:
an axial member provided on the axial line;
a first abutting member provided on an outer circumference of the axial member; and
a second abutting member provided on the outer circumference of the axial member, said second abutting member being axially adjacent to the first abutting member, and having a hardness that is different from a hardness of the first abutting member;
wherein an abutting member support of the axial member where the first abutting member and the second abutting member are provided is formed in a shape other than a circular shape with reference to a vertical cross-section to the axial line; and
wherein the outer shaft comprises a torque transmitting member which abuts only either the first abutting member or the second abutting member and which is capable of transmitting torque only with the abutting member that is abutting the torque transmitting member.

2. The steering device according to claim 1, wherein the torque transmitting member protrudes toward the inner shaft.

3. The steering device according to claim 1, wherein:
the torque transmitting member is disposed along an outer circumference of the first abutting member and an outer circumference of the second abutting member; and
an inner circumference surface of a portion of the outer shaft adjacent to the torque transmitting member is formed in a circular shape.

4. The steering device according to claim 1, wherein:
the first abutting member is formed of a rubber; and
the second abutting member is formed of a resin.

5. The steering device according to claim 1, wherein:
the abutting member support is formed in a substantially X-shape with reference to a vertical cross-section to the axial line; and
the first abutting member and the second abutting member are formed in a shape along an outer circumference of the abutting member support.

6. A steering device comprising:
an inner shaft rotatable around an axial line; and
an outer shaft partially covering the inner shaft and rotatable together with the inner shaft;
wherein the inner shaft and the outer shaft are provided so as to be relatively movable to each other along the axial line;
wherein the inner shaft comprises:
an axial member provided on the axial line;
a first abutting member provided on an outer circumference of the axial member; and
a second abutting member provided on the outer circumference of the axial member, and having a hardness that is different from a hardness of the first abutting member;
wherein an abutting member support of the axial member where the first abutting member and the second abutting member are provided is formed in a shape other than a circular shape with reference to a vertical cross-section to the axial line;
wherein the outer shaft comprises a torque transmitting member which abuts only either the first abutting member or the second abutting member and which is capable of transmitting torque only with the abutting member that is abutting the torque transmitting member,
wherein the torque transmitting member protrudes toward the inner shaft, and
wherein the outer shaft comprises:
a first cylindrical member formed in a substantially cylindrical shape; and a second cylindrical member coupled to an end of the first cylindrical member and formed in a substantially cylindrical shape;

circular portions of the inner circumference surface of the first cylindrical member are formed at two locations so as to hold the torque transmitting member therebetween with reference to a direction of the axial line;

the second cylindrical member comprises the two torque transmitting members; and the two torque transmitting members and the circular portions of the inner circumference surface at the two locations are arranged alternately.

7. The steering device according to claim 6, wherein:

the torque transmitting member is disposed along an outer circumference of the first abutting member and an outer circumference of the second abutting member; and an inner circumference surface of a portion of the outer shaft adjacent to the torque transmitting member is formed in a circular shape.

8. The steering device according to claim 6, wherein:

the first abutting member is formed of a rubber; and the second abutting member is formed of a resin.

9. The steering device according to claim 6, wherein:

the abutting member support is formed in a substantially X-shape with reference to a vertical cross-section to the axial line; and the first abutting member and the second abutting member are formed in a shape along an outer circumference of the abutting member support.

* * * * *